J. W. GELLING.
WHEEL VEHICLE.
APPLICATION FILED JAN. 21, 1919.
1,308,409.
Patented July 1, 1919.
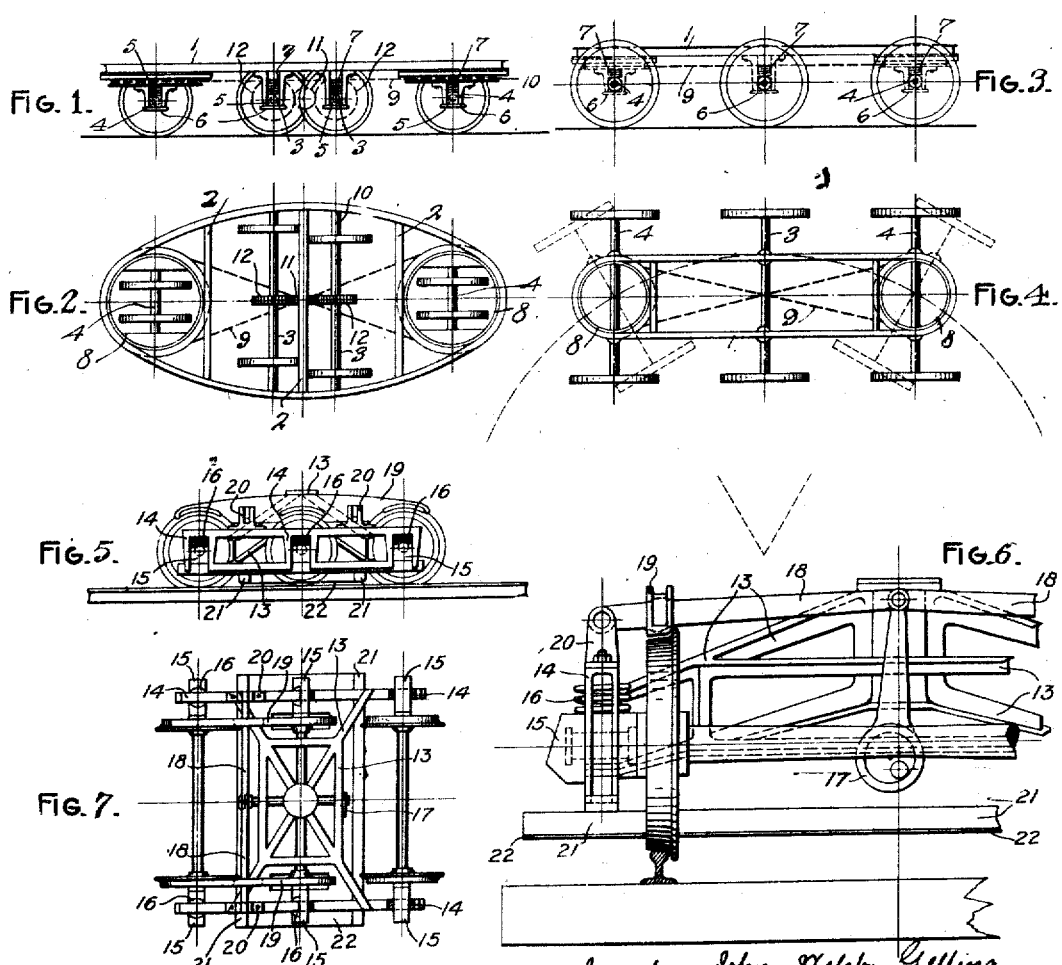
Inventor. John Welsby Gelling.
Witnesses:- E. T. Oakley
E. Murray

UNITED STATES PATENT OFFICE.

JOHN WELSBY GELLING, OF MEXICO, MEXICO.

WHEEL-VEHICLE.

1,308,409.

Specification of Letters Patent.   Patented July 1, 1919.

Application filed January 21, 1919. Serial No. 272,229.

*To all whom it may concern:*

Be it known that I, JOHN WELSBY GELLING, a citizen of Great Britain, residing in Mexico city, D. F., at the address for receiving notifications of No. 5, 2nd floor of the house, No. 8 avenue F. I. Madero, have invented certain new and useful Improvements for Wheel-Vehicles, of which the following is a description and specification.

My invention relates to vehicles for transportation on streets, roads or railroads. Its objects are:

1. The preservation of the road, the vehicle and its load by eliminating or minimizing the blows, shocks, shakings and other violent movements usual to such vehicles, with consequent gain in smoothness of running, increase of comfort and safety to the passengers, and decrease in the motive power required to drive the vehicle.

2. Economy in first cost, especially by the use of wheels of smaller diameter, and in most cases the suppression of pneumatic and other rubber tires, the defects and dangers of which are well known.

Briefly speaking, I employ a rigid frame having wheeled axles in excess of two sustained against downward movement, and pre-strained springs holding said axles at downward limit of their movement and permitting them to move upward only when an obstacle is encountered.

The nature of my invention will be more fully explained in the following specification and its scope more particularly pointed out in the appended claims.

Referring to the drawings:

Figure 1 is a side elevation of a vehicle embodying my invention and which is provided with four axles and with pre-strained or pre-controlled springs which only come into positive action and movement when an obstacle higher than the normal road surface is met with.

Fig. 2 is a top plan corresponding to Fig. 1.

Fig. 3 is a side elevation of a three axled vehicle having its wheels placed exterior to the rigid frame and its springs pre-strained or pre-controlled.

Fig. 4 is a top plan corresponding to Fig. 3.

Fig. 5 is a side elevation of a truck for tramway or railway service.

Fig. 6 is a more detailed end view, on a larger scale, of the truck of Fig. 5.

Fig. 7 is a top plan view corresponding to Fig. 5 and having the right half in section.

In the common or non-metallic road even when new slight depressions or hollows are present and these are under traffic made wider and deeper spoiling the road surface and requiring expensive repairs. This effect is due mainly to the faulty construction of vehicles whose wheels following exactly the contour of the road, drop into the hollows under the influence of gravity, augmented by the blow of the elastic spring which is pressed against the axle by the weight of the load carried, so that under these two forces the hollows where the material is softened by moisture collecting therein become deeper and worse for every wheel that passes. Injury to the road, wear and tear on the vehicle, damage to the load, and discomfort to the passengers result. Vehicles have to be made stronger and to be provided with more costly springs and other parts than would otherwise be necessary.

In the metallic road or railway, the short rail lengths employed to permit expansion and contraction and having their ends separated by a clearance space cannot be properly supported at these points by the usual fish plates and bolts, and perfection of surface is not attained even here. While the main body of the rail acts as a continuous girder with the load distributed over a dozen or more supports, the ends, on the contrary, are overhanging or in the air; the first traffic passing sinks the one solitary tie under the rail joint into the ballast by the downward springing of the rail ends as these have not half the resistance to the rolling load that is possessed by the rest of the rail and so this tie at the joint sinks below the others notwithstanding that most of the time of the section hands is spent in working on these points.

My invention approaches the subject from a point of view entirely different from the usual one. It recognizes these difficulties and obviates them, by providing a construction in which no individual wheel is allowed to drop into a hollow or press heavily upon weak points such as the joints in the rails of tramways and railways, being carried over these by the other wheels until arriving and being placed again on the normal surface of the road or railway and in which individual wheels may rise to pass over obstacles. This effect is obtained:

By the use of a rigid frame with three or more axles held so that no downward movement of the axles in their relation to said frame is permitted. Thus, in a vehicle of six or eight wheels, any one wheel is momentarily carried over or transported by the remaining wheels, and the frame as a whole travels practically parallel to the normal road surface. In order to permit a wheel to rise should it meet an obstacle higher than the normal road surface, the axles are provided with springs, but these are pre-controlled or pre-strained, which may conveniently be done when they are being applied to the vehicle, to an amount in pressure or tension rather more than the maximum load which each wheel is designed to carry so that a spring only comes into positive movement and action while the corresponding wheel surmounts an obstacle and returns to its normal position, these movements being effected without moving the frame.

Common or non-metallic roads are more or less plastic, in addition to the defects already pointed out. The metallic or railroads are flexible under the weight of passing loads, especially at the rail joints. Every wheel that passes over both classes of roads helps to augment these defects, whereas in my invention the opposite occurs and every wheel, pressing more heavily on the high parts, none on the lower and but little on the weak points, improves the road by making it more flat and straight for the wheel that follows, so that even a road that at the beginning was bad becomes a good one by use.

Steering and governing the vehicle is obtained by putting the front and back axles in subsidiary swiveling frames which move around a pivot or in sections or complete rings, with the surfaces in direct contact or with friction balls or rollers interposed. The moving parts are kept in accurate but free moving contact with the fixed parts in such a manner that there is no undue looseness, always holding in view the main principle of the invention viz:—that of not permitting any downward movement of axles and wheels in relation to the main rigid frame. In addition, the subsidiary moving frames are connected to one another by a crossed band or link belt, gearing, lever or rods, so that the two frames move in contrary arcs in unison and simultaneously, but in opposite directions and angles, and all axles become true radii to the curves taken.

It is best for some purposes to place within the frame essential parts like wheels and other accessories that might be easily damaged. For road vehicles this frame is preferably of an approximately elliptical form, which by its curved form and robustness protects the parts inclosed from damage by accidental collision or contact with other bodies or vehicles when in motion for the vehicle itself would simply glance off harmlessly from the collision.

I prefer to apply the driving power to the middle axle or middle axles, instead of to the rear one.

I also consider it desirable to lower the frame or put bars, joists or plates below it and a little higher than the road surface or the rail surface, so that in the case of derailment, breakage or damage to any axle, wheel or spring, the frame simply drops onto and slides harmlessly along said surface until it is brought automatically to rest by friction with it.

The brakes are preferably placed on top of the wheels instead of in front or back, enabling the wheels to be closer together, with less wear on the flanges in curves, and also avoiding the present unmechanical side wear of the bearings in the axle boxes.

All or part of the space between the frame may be boxed in so as to serve as a tank or tanks for liquids like water and oils, at the same time adding more rigidity to the frame.

My construction dispenses with the excessive number of springs (some types of trucks have twelve) saving expense and gaining more space and accessibility for the motors. Any system of springs can be applied between the main frame and the superstructure or upper body, according to the class of service in each case.

Referring to the drawings: Figs. 1 and 2 show the application of my invention to an automobile or truck for ordinary road use having a rigid elliptical frame 1 provided with cross braces 2 and supported by two axles 3 adjacent the middle of the frame and by axles 4 near each end thereof, said axles being mounted in axle boxes 5 which are held against the bottoms 6 of depending portions of the frame which prevent their downward movement by springs 7 pre-controlled or pre-strained, that is placed under compression or tension either before or during their application to the vehicle. This construction permits any of the wheels to rise and pass over an obstacle, but without lifting the frame. These figures also show means for applying the power to the axles near the middle of the vehicle, the pinion 11 carried by a jack shaft and working into spur gears 12 on the middle axles being provided for this purpose. The steering is effected in the manner above explained by placing the front and rear axles in swiveling frames 8 which frames are connected so as to turn in a horizontal plane correspondingly and oppositely as by the cross band or link belt 9 passing around the said swiveling frames and located in the grooves 10.

Figs. 3 and 4 show the application of my invention to a three axle road vehicle with wheels exterior to the main frame and with springs and steering arrangements as in Figs. 1 and 2.

Figs. 5, 6 and 7 show the application of the invention to a vehicle or truck for tram or railway. The main rigid frame 13 is connected to the two side frames 14 and these hold the axle boxes 15 from moving sidewise or downward, but allow a certain amount of upward movement when pressure on the springs 16 has exceeded the amount to which said springs were calculated and pre-controlled or pre-strained when placed in the frames 14. The eccentrics 17 give an up and down movement to the small ends of the levers 18, the big ends of which pass through the brakes 19 and are pivoted to the forked brackets 20. The bars 21 extend on either side of the side frames 14, sustaining below them a metal plate so that in case of derailment, breakage or damage to an axle, wheel or spring, the vehicle or truck can not fall beyond touching the road or rail, instead of having the wheels jumping over the road or ties, this also insures against damage when bridging over the space left by a broken rail. The plate is indicated 22.

In support of the statement that in my invention less motive power is required for traction, I note that experiments have always proved that vehicle springs, on returning to their normal, neutral or dead state, only give back seven-eighths of the force which has been used in deforming them and the difference or loss of energy of one-eighth repeated hundreds of times in every mile has to be made up by more force applied to the traction of the vehicle, whereas in my vehicle the number of movements of the springs is reduced to a minimum.

The main reason for having to use the largest possible diameter in the wheels of vehicles, according to the class of road surface, has always been that of presenting the most acute angle or greatest curve to an obstacle or hollow. By this invention, it is not now necessary to have so much regard to the inequalities in the road; smaller and lighter wheels can be used and their minimum diameter is only limited by the number of revolutions permissible in or on the axles.

It will be obvious to those skilled in the art to which the invention relates that modifications may be made in details without departing from the spirit and scope of the case. Hence I do not limit myself to the precise construction and arrangement of parts hereinafter referred to and illustrated in the accompanying drawings.

What I claim as my invention is:

1. In a vehicle, the combination of a rigid frame with three or more axles each sustained against downward movement with relation to said frame, wheels on said axles, the axles being so disposed that any individual wheel is momentarily carried over or transported by the other wheels when passing a hollow, weak place or rail joint in the road until arriving again at the normal surface of the road or rail, the frame meanwhile moving practically parallel to the normal surface of the road or rail, and pre-strained springs acting on individual axles and permitting upward movement when the limit to which the spring is pre-strained is exceeded.

2. A vehicle comprising in combination, a rigid frame, three or more axles mounted on the frame, wheels on said axles, each being sustained by the frame against downward movement with relation thereto, pre-strained springs acting upon said axles to hold them down against the frame but permitting the wheels to rise individually when in passing over an obstacle the limit to which the springs are pre-strained is exceeded.

3. A railway truck comprising in combination, a rigid frame, three or more axles, wheels on said axles, journal boxes carrying said axles and slidable in the frame, each journal box being sustained by the frame against downward movement with relation thereto, pre-strained springs acting upon said journal boxes to hold them down against the frame but permitting the wheels to rise individually when in passing over an obstacle the limit to which the springs are pre-strained is exceeded.

In testimony whereof I have hereunto signed my name this 23rd of October, 1918.

JOHN WELSBY GELLING.

Witnesses:
E. T. OAKLEY,
E. MURRAY.